US010921861B2

(12) United States Patent
Mii et al.

(10) Patent No.: US 10,921,861 B2
(45) Date of Patent: Feb. 16, 2021

(54) ELECTRONIC DEVICE INCLUDING LUMINOUS STRIP

(71) Applicant: ASUSTEK COMPUTER INC., Taipei (TW)

(72) Inventors: Chieh Mii, Taipei (TW); Ming-Chih Huang, Taipei (TW); Tong-Shen Hsiung, Taipei (TW); Meng-Chu Huang, Taipei (TW); Fu-Yu Cai, Taipei (TW); Shang-Chih Liang, Taipei (TW); Chia-Hao Hung, Taipei (TW); Li-Wei Yu, Taipei (TW); Chi Cheng Liao, Taipei (TW); Hsin-I Lu, Taipei (TW); Cheng-Yu Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/849,485

(22) Filed: Apr. 15, 2020

(65) Prior Publication Data

US 2020/0333850 A1    Oct. 22, 2020

(30) Foreign Application Priority Data

Apr. 22, 2019 (CN) .......................... 2019 1 0325625

(51) Int. Cl.
*G06F 1/16* (2006.01)
*F21S 4/20* (2016.01)
(Continued)

(52) U.S. Cl.
CPC .............. *G06F 1/1662* (2013.01); *F21S 4/20* (2016.01); *F21V 3/02* (2013.01); *F21Y 2115/10* (2016.08)

(58) Field of Classification Search
CPC ........ G06F 1/1662; G06F 1/16; G06F 3/0202; F21S 4/20; F21S 10/005; F21V 3/02; F21V 33/0052; F21Y 2115/10
See application file for complete search history.

(56) References Cited

U.S. PATENT DOCUMENTS 7,015,988 B2 * 3/2006 Ogino ................. F21V 33/0052
                                                    348/E5.128
7,781,722 B2 * 8/2010 Lieberman ............ G06F 3/0421
                                                    250/221

(Continued)

FOREIGN PATENT DOCUMENTS

CN         201513790 U    6/2010
WO    WO 2001/003338   *  1/2011 ................ F21S 8/00

OTHER PUBLICATIONS

WO 2011/003338, Jan. 13, 2011, Chen, English Translation (Year: 2011).*

*Primary Examiner* — Peggy A Neils
(74) *Attorney, Agent, or Firm* — Muncy, Geissler, Olds & Lowe, P.C.

(57) ABSTRACT

An electronic device including a luminous strip is provided, including a housing, a first light guiding strip, a second light guiding strip, a light-transmissive structure, a first light-emitting element, a second light-emitting element and a third light-emitting element. The housing includes a first side wall and a second side wall, where a corner area exists between the first side wall and the second side wall. The first light guiding strip is disposed on the first side wall. The second light guiding strip is disposed on the second side wall. The light-transmissive structure is disposed in the corner area, and connected to the first light guiding strip and the second light guiding strip. The first light-emitting element is disposed at a first end of the first light guiding strip. The second light-emitting element is disposed at a second (Continued)

end of the second light guiding strip. The third light-emitting element is disposed between the first light-emitting element and the second light-emitting element, and spaced apart from the light-transmissive structure by a preset distance, to emit light on the light-transmissive structure. A three-dimensional light effect is presented on the electronic device at low costs by using only a small number of elements, to improve the product appearance.

10 Claims, 8 Drawing Sheets

(51) Int. Cl.
*F21V 3/02* (2006.01)
*F21Y 115/10* (2016.01)

(56) References Cited

U.S. PATENT DOCUMENTS

| | | | |
|---|---|---|---|
| 8,854,336 B2 * | 10/2014 | Lai | G06F 3/0428 |
| | | | 345/175 |
| 8,888,379 B2 * | 11/2014 | Yamamoto | H05K 7/00 |
| | | | 385/88 |
| 9,367,175 B2 * | 6/2016 | Kim | G06F 3/0428 |
| 2005/0073857 A1 * | 4/2005 | Kuo | G02B 6/001 |
| | | | 362/560 |
| 2012/0032887 A1 * | 2/2012 | Chiu | G06F 1/1662 |
| | | | 345/168 |

* cited by examiner

ELECTRONIC DEVICE INCLUDING LUMINOUS STRIP

CROSS-REFERENCE TO RELATED APPLICATION

This application claims the priority benefit of Chinese Application Serial No. 201910325625.8, filed on Apr. 22, 2019. The entirety of the above-mentioned patent application is hereby incorporated by reference herein and made a part of the specification.

BACKGROUND OF THE INVENTION

Field of the Invention

The disclosure relates to a housing, and in particular, to a housing of an electronic device.

Description of the Related Art

The appearance design of electronic devices (such as notebook computers) is a critical factor to highlight the distinct features of products to attract customers. In particular, using lights to produce special effect for appearance becomes more and more popular. However, the applications for conventional electronic devices are limited by the structural of the light bars that only a segment light emitting pattern is presented on a side edge, and it is difficult to conduct continuous light emitting patterns.

BRIEF SUMMARY OF THE INVENTION

The disclosure provides an electronic device including a luminous strip. The electronic device includes a housing, a first light guiding strip, a second light guiding strip, a light-transmissive structure, a first light-emitting element, a second light-emitting element and a third light-emitting element. The housing includes a first side wall and a second side wall, where a corner area exists between the first side wall and the second side wall.

The first light guiding strip is disposed on the first side wall. The second light guiding strip is disposed on the second side wall. The light-transmissive structure is disposed in the corner area, and connected to the first light guiding strip and the second light guiding strip. The first light-emitting element is disposed at a first end of the first light guiding strip. The second light-emitting element is disposed at a second end of the second light guiding strip. The third light-emitting element is disposed between the first light-emitting element and the second light-emitting element, and spaced apart from the light-transmissive structure by a preset distance, to emit light to the light-transmissive structure.

Based on the above, the electronic device provided in the disclosure presents a continuous light-emitting pattern in the corner area by using a small number of light-emitting elements. Therefore, a three-dimensional light effect is presented on the electronic device at low costs by using only a small number of elements according to the disclosure, thus to improve the product appearance.

DETAILED DESCRIPTION OF THE EMBODIMENTS

Specific embodiments of the disclosure are further described below with reference to schematic drawings. The advantages and features of the disclosure is much clear according to the following descriptions and claims. It should be noted that the drawings, which are in simplified forms and not drawn to scale, are merely used for facilitating a clear understanding of the embodiments of the disclosure.

Figure 1:
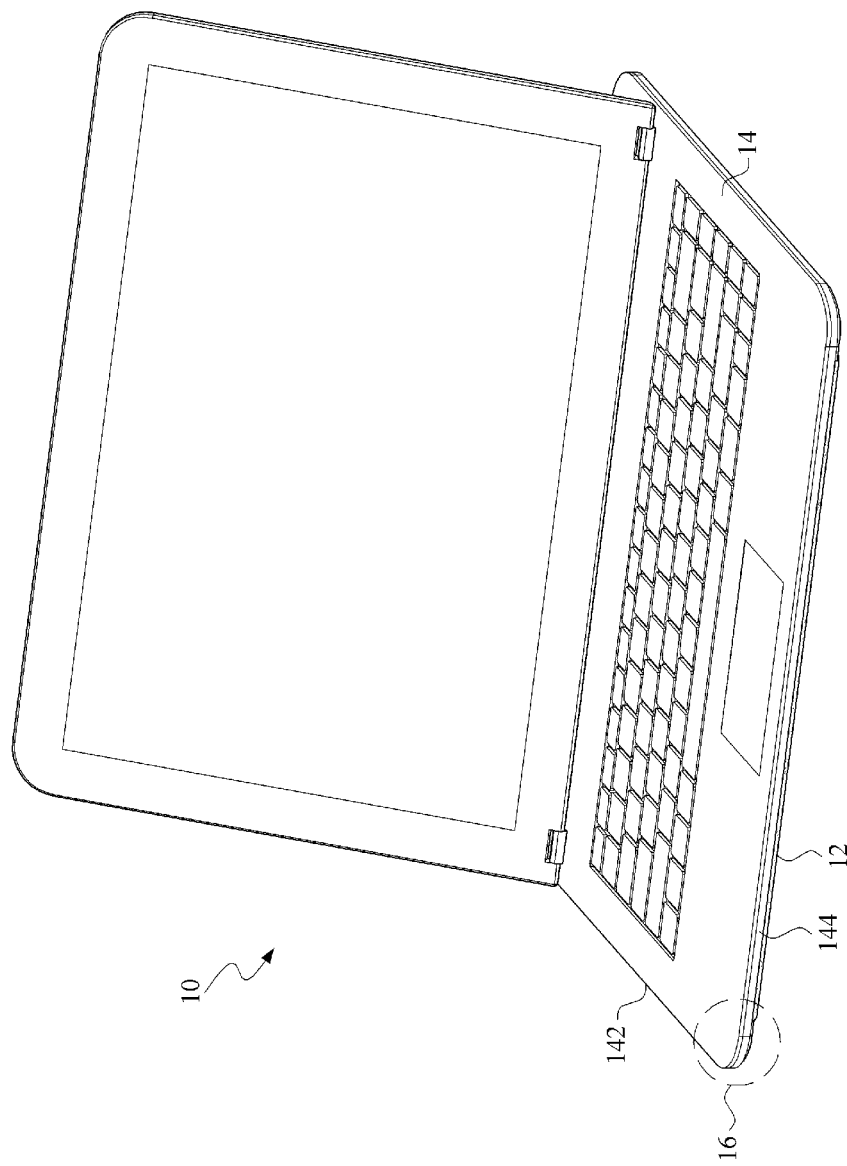
FIG. 1 is a schematic three-dimensional view of an embodiment of an electronic device according to the disclosure.
Figure 1A:
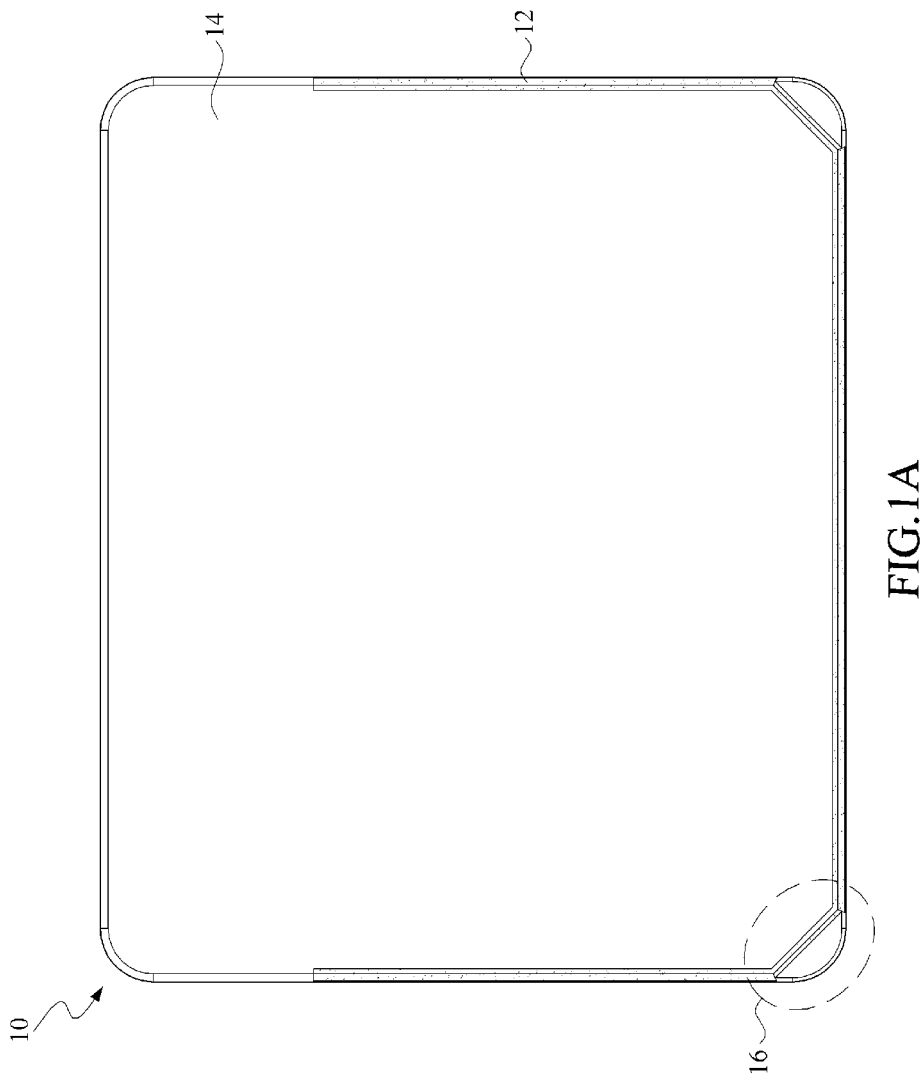
FIG. 1A is a schematic bottom view of the electronic device in FIG. 1.

FIG. 1 is a schematic three-dimensional view of an embodiment of an electronic device 10 according to the disclosure. FIG. 1A is a schematic bottom view of the electronic device 10 in FIG. 1. In this embodiment, the electronic device 10 is a notebook computer. A U-shaped luminous strip 12 is mounted on a housing 14 of a keyboard part of the notebook computer. In an embodiment, the U-shaped luminous strip 12 is able to be applied to a housing around a screen of the notebook computer. In some embodiments, the electronic device 10 is a desktop computer, a tablet computer or other electronic device that able to be applied with a luminous strip.

Figure 2:
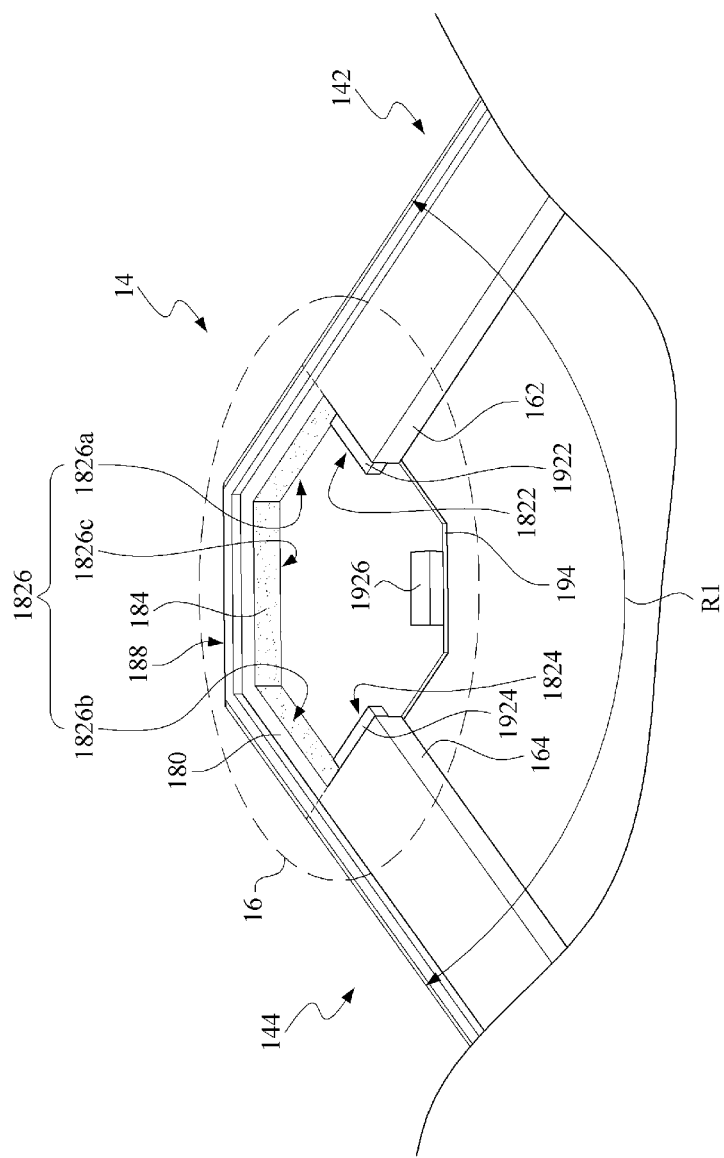
FIG. 2 is an enlarged view of a corner area of a housing of the electronic device in FIG. 1.

FIG. 2 is an enlarged view of a corner area 16 of a housing 14 of the electronic device in FIG. 1. In the figure, an upper cover (that is, a housing portion at which the keyboard is disposed) of the keyboard part of the notebook computer is removed, to show an internal structure of the housing 14.

As shown in the figure, the housing 14 includes a first side wall 142 and a second side wall 144. A corner area 16 exists between the first side wall 142 and the second side wall 144. In this embodiment, the first side wall 142 is located at a front side of the housing 14, that is, a side of the housing 14 close to a user, and the second side wall 144 is located on a lateral side of the housing 14. In an embodiment, the first side wall 142 is located at a rear side of the housing 14. In addition, in an embodiment, the housing 14 is a rectangular housing, and an angle R1 between the first side wall 142 and the second side wall 144 ranges from 70 degrees to 110 degrees.

A first light guiding strip 162 is disposed on the first side wall 142. A second light guiding strip 164 is disposed on the second side wall 144. A light-transmissive structure 180 is disposed in the corner area 16, and connected to the first light guiding strip 162 and the second light guiding strip 164. In this embodiment, the first light guiding strip 162, the second light guiding strip 164 and the light-transmissive structure 180 are integrally formed, to reduce the number of elements and simplify assembly procedures.

In an embodiment, to adapt to different designs of the housing of the electronic device, the first light guiding strip 162, the second light guiding strip 164 and the light-transmissive structure 180 are independent components.

Figure 2A:
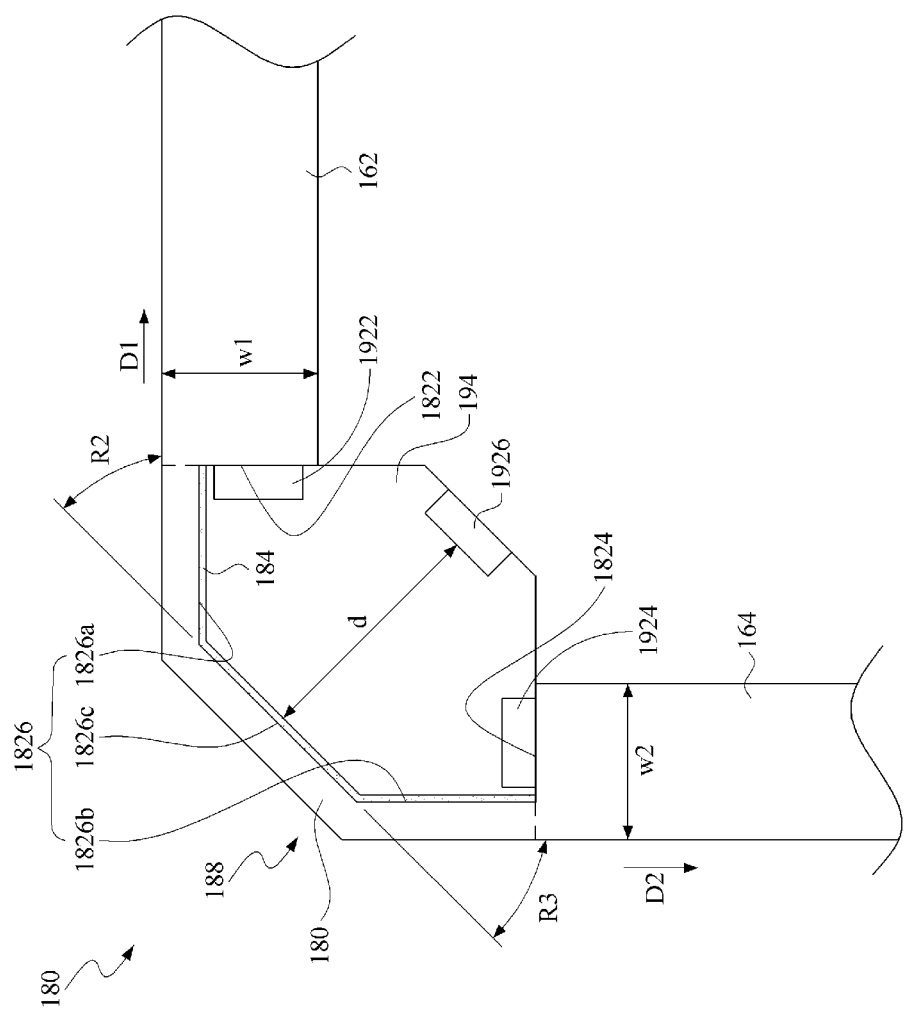
FIG. 2A is a schematic top view after the housing in FIG. 2 is removed.

Refer to FIG. 2A, which is a schematic top view after the housing in FIG. 2 is removed. As shown in the figure, the light-transmissive structure 180 includes an inner surface 1826. The first light guiding strip 162 includes a first end 1822. The second light guiding strip 164 includes a second end 1824. In this embodiment, the inner surface 1826 of the light-transmissive structure 180 includes a plane 1826*c* and two end portions 1826*a* and 1826*b*.

The two end portions 1826*a* and 1826*b* respectively extend to the first end 1822 of the first light guiding strip 162 and the second end 1824 of the second light guiding strip 164. An angle R2 between the plane 1826*c* and an extending direction D1 of the first light guiding strip 162 ranges from 30 degrees to 60 degrees, and an angle R3 between the plane 1826*c* and an extending direction D2 of the second light guiding strip 164 ranges from 30 degrees to 60 degrees, to avoid affecting the continuity of a light-emitting pattern due to an excessively large corner angle. In an embodiment, as shown in the figure, both the angle R2 and the angle R3 are 45 degrees.

The first light-emitting element 1922 is disposed at the first end 1822 of the first light guiding strip 162, to emit light to the first light guiding strip 162. The second light-emitting element 1924 is disposed at the second end 1824 of the second light guiding strip 164, to emit light to the second light guiding strip 164. The third light-emitting element 1926 is disposed between the first light-emitting element 1922 and the second light-emitting element 1924, and emits light in a direction approximately aligned with a central position of the inner surface 1826 of the light-transmissive structure 180.

In an embodiment, the first light-emitting element 1922, the second light-emitting element 1924 and the third light-emitting element 1926 emit light of different colors, which is mixed into a variety of colors in the corner area 16, to provide more diversified visual effects.

In an embodiment, the first light-emitting element 1922, the second light-emitting element 1924 and the third light-emitting element 1926 emit light of the same color. In addition, in an embodiment, the first light-emitting element 1922 disposed at the first end 1822 of the first light guiding strip 162 and a light-emitting element (not shown) disposed at the other end of the first light guiding strip 162 emit light of different colors, which is mixed into a variety of colors in the first light guiding strip 162, to provide more diversified visual effects.

The third light-emitting element 1926 is spaced apart from the light-transmissive structure 180 by a preset distance d, to ensure that light generated by the third light-emitting element 1926 is effectively distributed on the light-transmissive structure 180. In an embodiment, the preset distance d is greater than a width w1 of the first light guiding strip 162 or a width w2 of the second light guiding strip 164.

In addition, as an external structure of the light-transmissive structure 180 also affects the light-emitting effect at the corner area 16, as shown in FIG. 2A, in this embodiment, an outer surface of the light-transmissive structure 180 includes a chamfer 188, to avoid discontinuity of the light-emitting pattern resulting from concentration of light caused by an excessively large corner angle of the outer surface of the light-transmissive structure 180.

In an embodiment, the chamfer 188 is substantially parallel to the plane 1826*c*. In an embodiment, an angle of the chamfer 188 is 45 degrees, to increase the light-emitting uniformity of the light-transmissive structure 180 in the corner area 16.

Light generated by the third light-emitting element 1926 is directly emitted outward through the light-transmissive structure 180, and light generated by the first light-emitting element 1922 and the second light-emitting element 1924 is emitted outward from outer surfaces of the first light guiding strip 162 and the second light guiding strip 164 under the guidance of the first light guiding strip 162 and the second light guiding strip 164. To prevent the luminous intensity of the third light-emitting element 1926 from being too high to affect the continuity of the light-emitting pattern of the corner area 16, in an embodiment, the brightness of the third light-emitting element 1926 is lower than the brightness of the first light-emitting element 1922 and the second light-emitting element 1924.

In an embodiment, as shown in the figure, a diffusion film 184 is adhered to the inner surface 1826 of the light-transmissive structure 180 to enhance the light-emitting uniformity of the corner area 16. The adhesion of the diffusion film 184 is an implementation of enhancing the light-emitting uniformity. In an embodiment, a fine and rough structure is directly formed on the inner surface 1826 of the light-transmissive structure 180 to enhance the light-emitting uniformity.

In an embodiment, the first light-emitting element 1922, the second light-emitting element 1924 and the third light-emitting element 1926 are disposed on a same circuit board 194 to simplify assembly procedures. The appearance of the circuit board 194 corresponds to the appearance of the inner surface 1826 of the light-transmissive structure 180. In addition, the first light-emitting element 1922, the second light-emitting element 1924 and the third light-emitting element 1926 are light-emitting diodes.

Figure 3:
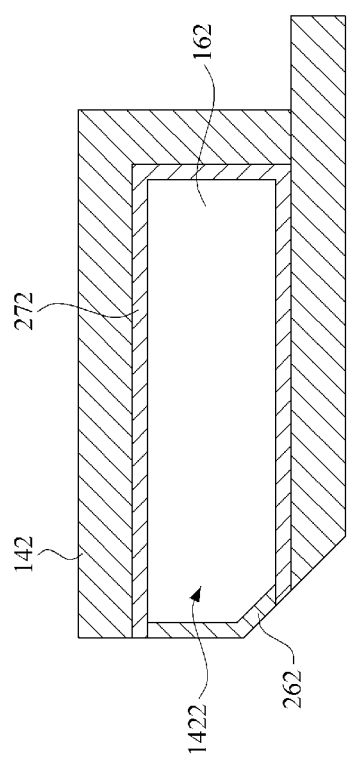
FIG. 3 is a schematic cross-sectional view of a side wall of the housing of the electronic device in FIG. 1.

FIG. 3 is a schematic cross-sectional view of the first side wall 142 of the housing 14 of the electronic device in FIG. 1. In the figure, the upper cover of the keyboard part of the notebook computer is removed. As shown in the figure, the first side wall 142 includes a groove 1422 to accommodate the first light guiding strip 162. In addition, to enhance the luminous efficiency of the first light guiding strip 162, a light reflective film 272, such as a white film layer, is provided between the groove 1422 and the first light guiding strip 162. The light reflective film 272 covers upper and lower surfaces and the inner surface of the first light guiding strip 162 to ensure that light is effectively emitted outward from the outer surface of the first light guiding strip 162.

In addition, to provide the uniformity of light emitted outward from the outer surface (that is, the light emitting surface) of the first light guiding strip 162, a light diffusion structure 262 is formed on the outer surface of the first light guiding strip 162 by adhering a diffusion film or forming a fine and rough structure on the surface of the first light guiding strip 162 or other means. In this embodiment, during the formation of the first light guiding strip 162, a fine and rough structure is directly formed on the outer surface of the first light guiding strip 162 to serve as the light diffusion structure 262 to enhance the light-emitting uniformity. The foregoing embodiments are descriptions of the first side wall 142 of the disclosure. The technical features described in this embodiment also apply to the second side wall 144 of the disclosure.

Figure 4:
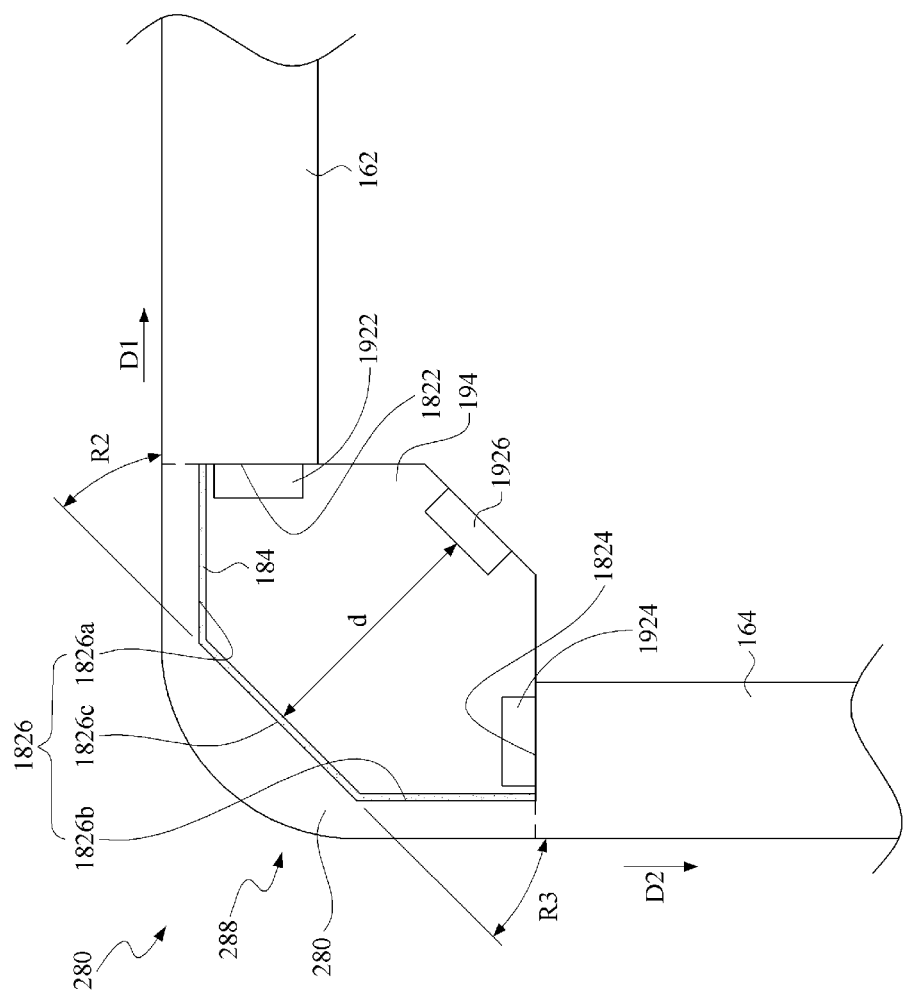
FIG. 4 is a schematic view of a light-transmissive structure of an electronic device.

FIG. 4 is a schematic view of a corner area of another embodiment of an electronic device according to the disclosure. Compared with the embodiment in FIG. 2A in which the outer surface of the light-transmissive structure 180 includes the chamfer 188, an outer surface of a light-transmissive structure 280 in this embodiment includes a fillet 288. Two ends of the fillet 288 respectively extend to connect to the outer surfaces of the first light guiding strip 162 and the second light guiding strip 164, and respectively turn to the extending direction D1 of the first light guiding strip 162 and the extending direction D2 of the second light guiding strip 164, to avoid discontinuity of the light-emitting pattern resulting from the formation of a discontinuous surface on the outer side of the light-transmissive structure 280.

Figure 5:
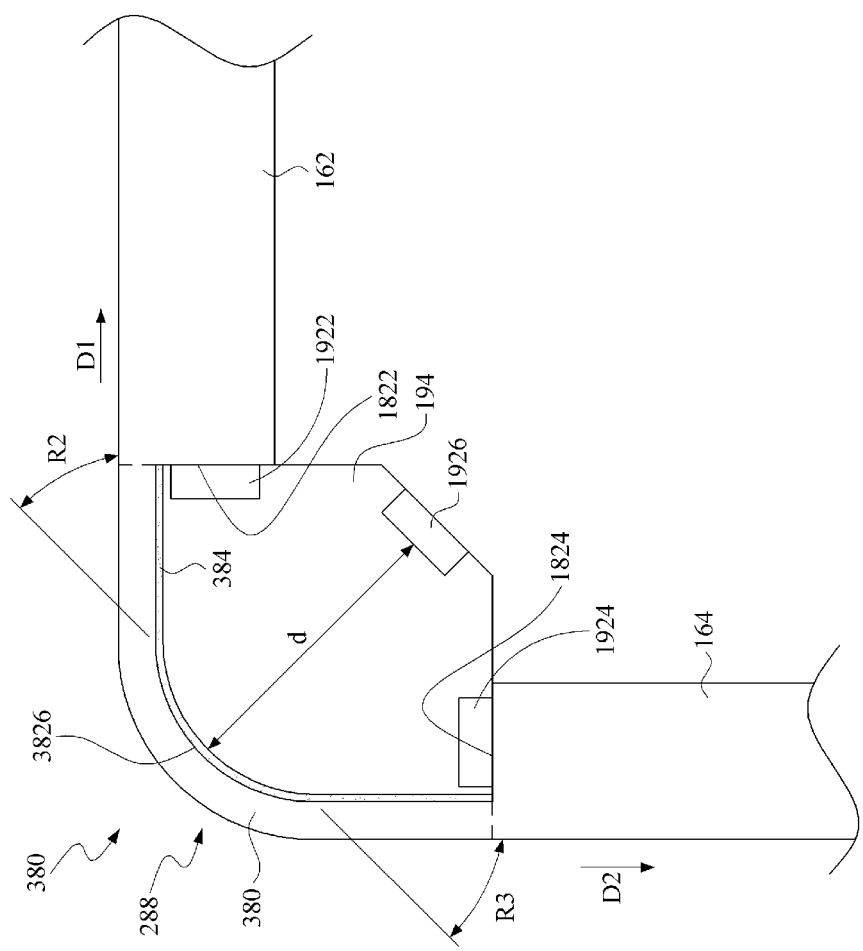
FIG. 5 is a schematic view of a light-transmissive structure of an electronic device.

FIG. 5 is a schematic view of a corner area of still another embodiment of an electronic device according to the disclosure. Compared with the embodiment in FIG. 3 in which a middle section of the inner surface 1826 of the light-transmissive structure 180 is the plane 1826c, a middle section of an inner surface 3826 of a light-transmissive structure 380 in this embodiment is a curved surface. An extending direction of the curved surface substantially corresponds to an extending direction of the fillet 288 on the outer surface of the corner light-transmissive structure 380, to avoid discontinuity of the light-emitting pattern resulting from the formation of a discontinuous surface on the inner surface of the light-transmissive structure 280. This embodiment helps enhance the uniformity of light in the corner area.

Figure 6:
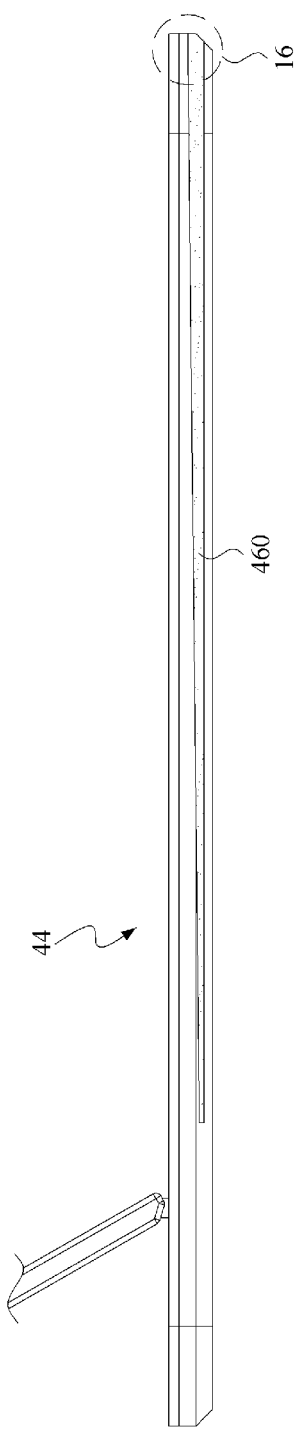
FIG. 6 is a schematic view of an embodiment of a light guiding strip.

FIG. 6 is a schematic view of an embodiment of a light guiding strip 460 according to the disclosure. The light guiding strip 460 in the figure is disposed on a side surface of the housing 44 of the electronic device. A front end of the light guiding strip 460 is connected to the light-transmissive structure (not shown in the figure) in the corner area 16, to guide the light generated by the light-emitting element disposed in the corner area toward the rear side, and emit light outward through an outer surface of the light guiding strip 460. A width of the light guiding strip 460 gradually decreases from front to rear, to compensate for the brightness attenuation caused by an increase in the light propagation distance, thereby ensuring the light-emitting uniformity of the front and rear sections of the light guiding strip 460.

Based on the above, the electronic device provided in the embodiment presents a continuous light-emitting pattern on the first light guiding strip 162, the second light guiding strip 164 and the light-transmissive structures 180, 280 and 380 in the corner area by using only three light-emitting elements 1922, 1924 and 1926 in combination. The U-shaped luminous strip 12 in the FIG. 1 presents a continuous light-emitting pattern by using only six light-emitting elements. According to the disclosure, a three-dimensional light effect is presented on the electronic device at low costs by using only a small number of elements, to enhance the distinct features of the product appearance.

Although the invention is described with reference to the above embodiments, the embodiments are not intended to limit the invention. Any person skilled in the art may make variations and modifications without departing from the spirit and scope of the invention. Therefore, the protection scope of the invention should be subject to the appended claims.

What is claimed is:

1. An electronic device, comprising:
   a housing, comprising a first side wall and a second side wall, wherein a corner area exists between the first side wall and the second side wall;
   a first light guiding strip, disposed on the first side wall;
   a second light guiding strip, disposed on the second side wall;
   a light-transmissive structure, disposed in the corner area, and connected to the first light guiding strip and the second light guiding strip;
   a first light-emitting element, disposed at a first end of the first light guiding strip to emit light to the first light guiding strip;
   a second light-emitting element, disposed at a second end of the second light guiding strip to emit light to the second light guiding strip; and
   a third light-emitting element, disposed between the first light-emitting element and the second light-emitting element, and spaced apart from the light-transmissive structure by a preset distance, to emit light to the light-transmissive structure.

2. The electronic device according to claim 1, wherein the first light guiding strip, the second light guiding strip and the light-transmissive structure are integrally formed.

3. The electronic device according to claim 1, wherein an outer surface of the light-transmissive structure comprises a chamfer.

4. The electronic device according to claim 1, wherein an outer surface of the light-transmissive structure comprises a fillet.

5. The electronic device according to claim 1, wherein an angle exists between an extending direction of the first side wall and an extending direction of the second side wall, and the angle ranges from 70 degrees to 110 degrees.

6. The electronic device according to claim 1, wherein the first side wall comprises a groove to accommodate the first light guiding strip.

7. The electronic device according to claim 6, further comprising a light reflective film formed between the groove and the first light guiding strip.

8. The electronic device according to claim 1, wherein the first light guiding strip comprises a light emitting surface, and the light emitting surface comprises a light diffusion structure.

9. The electronic device according to claim 1, wherein the light-transmissive structure comprises an inner surface, and the inner surface comprises a light diffusion structure.

10. The electronic device according to claim 1, wherein brightness of the third light-emitting element is lower than brightness of the first light-emitting element.

* * * * *